United States Patent [19]

Klingensmith

[11] 4,400,696
[45] Aug. 23, 1983

[54] ANIMAL ACTUATED ATTENTION ATTRACTING APPARATUS

[76] Inventor: Robert R. Klingensmith, Box 2010, Sparks, Nev. 89431

[21] Appl. No.: 258,781

[22] Filed: Apr. 29, 1981

[51] Int. Cl.³ .................. G08B 23/00; H01H 3/16
[52] U.S. Cl. ................................. 340/573; 119/1; 200/61.58 R; 200/61.7; 340/384 E
[58] Field of Search ............ 340/573, 384 E, 540; 119/1, 29; 200/61.58 R, 61.62, 61.7

[56] References Cited

U.S. PATENT DOCUMENTS

| | | | |
|---|---|---|---|
| 1,118,283 | 11/1914 | Holdefer | 340/573 |
| 3,020,038 | 2/1962 | Simpson | 200/61.62 X |
| 3,111,608 | 11/1963 | Boenning et al. | 340/573 X |
| 3,391,674 | 7/1968 | Burleigh | 119/1 X |
| 3,874,118 | 4/1975 | Robinson | 119/29 X |

*Primary Examiner*—John W. Caldwell, Sr.
*Assistant Examiner*—Joseph E. Nowicki
*Attorney, Agent, or Firm*—John W. Huckert

[57] ABSTRACT

A device for enabling animals to attract attention of a keeper thereof when the animal desires to obtain entrance into a house or other building comprising a door mounted contact and wire feed through element, and adjustable hinged outside door mounted panel member, and adjustable contact member mounted on the hinged panel member for contact with the door mounted contact when the panel member is actuated, adjustable tension means for normally maintaining the hinged panel member in an unactuated contact position, an inside door mounted container provided with appropriate electrical energization, wiring, and both visual and audible attention attracting elements, and a multiple position switch for permitting selection of the desired attention attracting element when the panel member is actuated by an animal.

11 Claims, 4 Drawing Figures

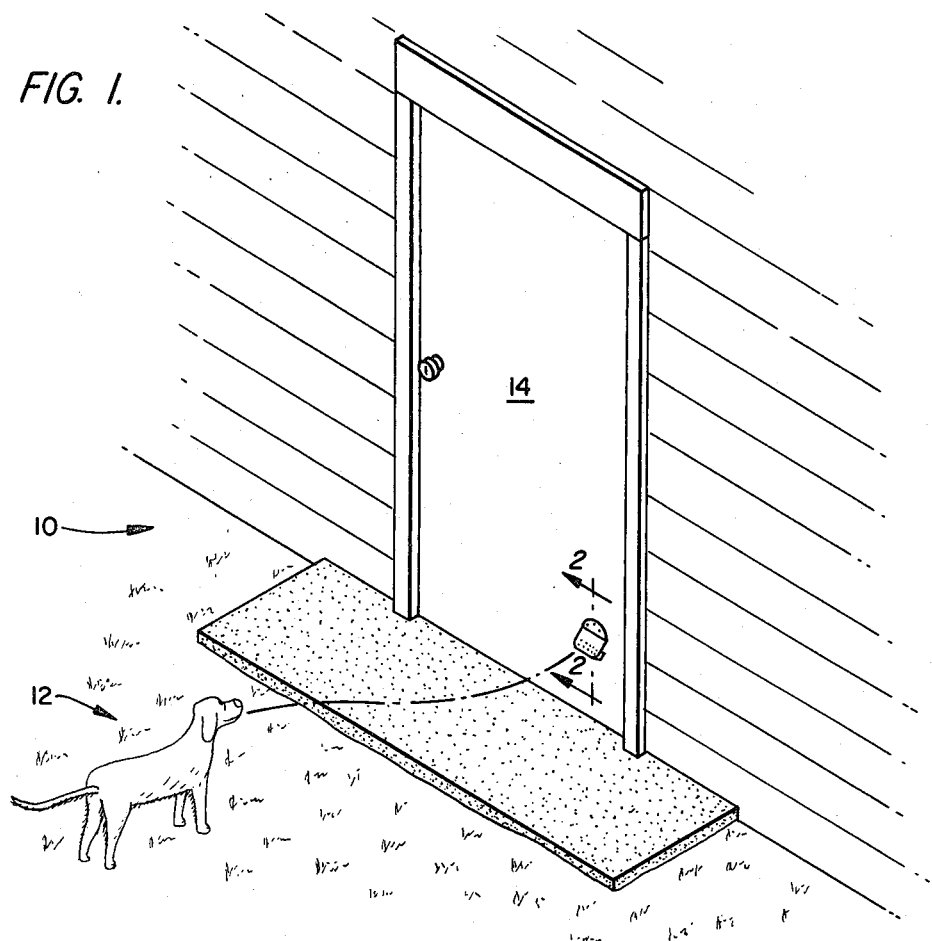
FIG. 1.
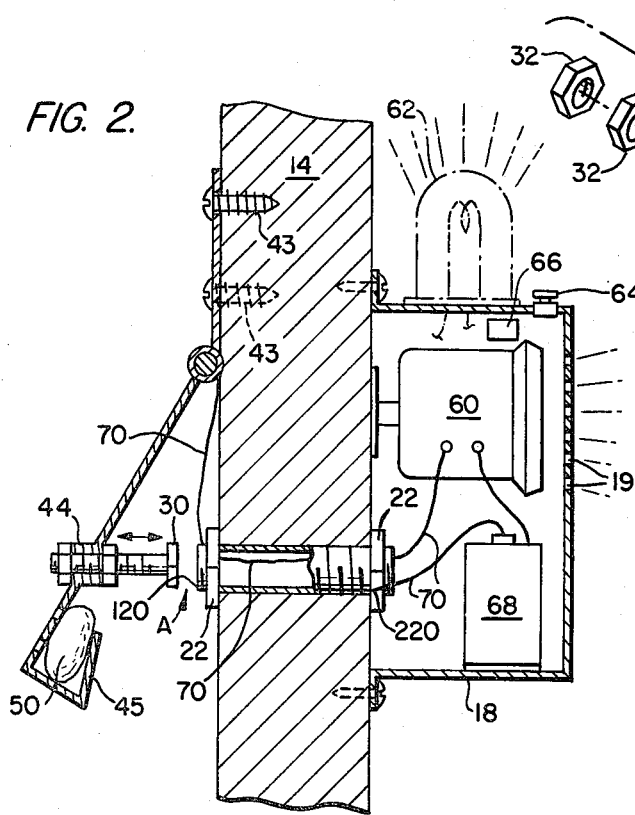
FIG. 2.
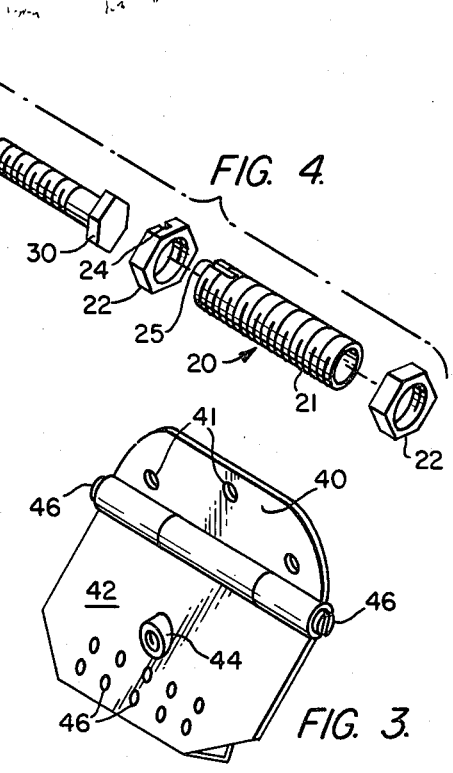
FIG. 3.
FIG. 4.

ANIMAL ACTUATED ATTENTION ATTRACTING APPARATUS

BACKGROUND OF THE INVENTION

1. Field of the Invention

The present invention is related to devices for enabling animals to attract the attention of the owner thereof when desiring to obtain entrance into a house or other building.

2. Description of the Prior Art

Different prior art devices have been devised for enabling animals, pets and birds to attract the attention of a keeper thereof at appropriate times. For example, U.S. Pat. No. 1,118,283 to R. H. Holdefer discloses a buzzer which is actuated when a pigeon enters a building thereby notifying the keeper of the arrival of the pigeon. U.S. Pat. No. 2,634,409 to Walcher shows structure of a door bell mounted on one side of a door with a battery operated buzzer on the other side for attracting attention. U.S. Pat. Nos. 4,022,263 and 4,216,736 show magnetically operated pet door latches of general interest. However, none of the known prior art devices offer the new and novel features of the present invention, nor do any of them disclose the many new and unique features of the present invention.

SUMMARY OF THE INVENTION

The invention of this application is for a device which may be mounted upon a door, or similar vertical panel, which has an animal actuated hinged panel member on the outside of the door together with an electrical contact point adjustably secured thereto. The panel is supported by a hinge having a built in spring tension device and the panel is arranged to extend outwardly from the door with the adjustable contact point in non-contacting position with further electrical structure mounted on the door. This further electrical structure consists of a tubular feedthrough housing which may be mounted in a door by a drilled hole therethrough, and then the outside threaded tubing adjustably mounted by nuts on either side of the door to adjustably fasten the feedthrough and electrical contact tubing in correct contact position in the door. One end of the tubing is appropriately slit for permitting a feedthrough wire connected to the hinged panel to be led through the door to the other side into a container box which holds the appropriate energization battery, horn, light, and selector switch for turning the device on and connecting the horn, and/or light to the circuit. The switch permits both the horn and light to be simultaneously actuated, or either one without the other to be actuated. This, of course, increases the overall flexibility and use possibilities of the system and apparatus of the present invention.

Preferably, the horn is of the low voltage "fire alarm" type which emits a very penetrating and loud noise. Of course, a lower sound emitting horn or even a DC buzzer may be used where the volume of noise need not be so great. An appropriate light of 6 or 9 volt type also is included with the device, as well as a battery of preferably 9 volt type, but of course of lesser voltage and A, D or C cell type may be used.

An object of the present invention is to provide an animal actuated attention attracting apparatus for use with doors or the like which will enable a pet to indicate to the owner thereof that the pet desires entrance into the building.

A further object is to provide a door or panel mounted hinged panel member supported by an adjustable spring tension hinge for normally maintaining electrical contact on the panel in non-actuating position with an electrical contact structure mountable through the door so that a combination sound and light device including appropriate electrical energization means therefor may be actuated.

A further object is to provide multiple adjustments for the device including a panel mounted pin contact electrode, a adjustable tubular door feedthrough and electrical wire conductor element, and a switchable attention attracting device for emitting loud piercing noises and/or flashing light or steady light attention getting sound and light.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the present invention as mounted on a door for use by a pet animal;

FIG. 2 is a side elevational view, partly in cross-section, taken generally along lines 2—2 of FIG. 1;

FIG. 3 is a perspective view of the hinge mounted actuating panel together with adjustable spring tension structure; and FIG. 4 is an exploded perspective view of the door mounted electrical contact and conductor wire pass through structure.

DESCRIPTION OF THE PREFERRED EMBODIMENTS

Looking at FIG. 1 of the drawings, reference 10 indicates in general the door mounted apparatus of the present invention, ready for actuation by an animal pet 12, in this case a dog. The door 14, as seen in partial cross-section in FIG. 2, has the outer animal actuated hinge panel member mounted thereon, and also is provided with an electrical pass through and contact structure as shown in greater detail in FIG. 4. Mounted on the inside of the door is a box 18 which contains the attention attracting apparatus and also a battery energization source. Of course, instead of batteries, wiring may be supplied to this box for suitable connection to the electrical house current, but in most situations battery power is to be preferred.

FIG. 3 shows the actuating panel and mounting device per se which consists of a hinge support portion 40 having appropriate apertures 41 therein for reception of the attaching screws 43 therethrough in conventional manner. The hinged panel 42 of the device is the main actuating part of the invention. The lower part of panel 42 is provided with a U-shaped holder 45 in which suitable animal candies or food 50 may be placed. Aroma emitting holes 46 are preferably provided through the panel. Also mounted as part of the panel is an enlarged boss 44 through which an appropriate aperture is provided which is threaded internally. This aperture receives the threaded screw 34 of the pin head contact 30. If desired, one or two lock nuts 32 may be provided on either side of the boss for permanent securement of the pin head contact once adjusted. However, since very little vibration and other disturbance will be present, usually the lock nuts may be omitted and the threaded screw, especially if of fine threads, is sufficient to retain whatever adjustment has been made.

As seen in FIG. 4, the electrical contact and pass through member 20 is provided with external threads 21 therealong. Thus, this tubular member may be appropriately adjusted for various thicknesses of doors and also for adjustable contact with the pin head contact 30. A slit 25 may be provided in at least one end of the tubular member 20 to enable the portion of the conductor wire 70 which is external of the door, to fit tightly against the outside of the door, and be secured thereto by scotch tape or the like. Also in case of doors which are quite thick, wherein the length of tubular member 20 is just slightly greater than the overall thickness of the door, the lock nuts 22, or at least one of them, may be provided with a groove 24 to permit passage of wire 70 therethrough without interfering with the making of electrical contact with the contact 30 and the outer end portion 120 of the tubular element above or in some cases with the lock nut 22.

As seen in FIG. 2, the container box 18 mounted on the inside of the door has appropriate holes 19 therein to permit the sound from horn or buzzer 60 to be emitted with minimum attenuation. Also a light 62 is mounted externally of the box, and a rotary switch 64 having a knob external of the box is provided. This switch 64 is connected by the wiring 70 as appropriate so that the contact structure, the battery, and both the horn/buzzer 60, and light 62 may be energized simultaneously. The inner lock nut for the inside and end of tubular member 20 may be used to secure the stripped end of one of the wires 70 as shown in FIG. 2. The switch also is provided with separate contacts for just the horn, and just the light, so that either one or the other alone can be energized when the contacts are closed externally of the door.

As can be easily visualized, the apparatus of the present invention permits a plurality of adjustments. First, there is an adjustment of the spring tension for the pivotally mounted actuating panel 42, which is preferably screw-driven adjustable 46, 46 from externally of the door by the installer thereof, or may be adjusted for either a light or heavy actuating presure with substantial permanence of adjustment once made. Also, the contact 30, is adjustable by screw threads 34 through the panel boss 44 which will in turn adjust the gap A as indicated in FIG. 2, and then in addition the pass through electrical contact tubular member 20 is adjustable for both its relative positioning through a door, as well as for various thicknesses of doors.

Furthermore, the rotary switch 64 permits a plurality of attention attracting devices, i.e., horn, buzzer, light(s), etc., to be switched into the system. In addition, a flasher cell 66 may be provided in series with the light energization wiring (in conventional manner) so that whatever type of light 62 is used, it can be flashed intermittently to further attract attention.

Of course, the present invention can be used with all types of domestic pets, including dogs, cats, monkeys, etc. Furthermore, partly domesticated animals such as pigs, chickens, ducks, squirrels, raccoons, etc., may be trained to operate this device.

Furthermore, in zoos or animal sanctuaries, animals such as lions and tigers and various other wild animals can be trained so that this device could be used therewith and, of course, pigeons and other type of flying fowl can use this apparatus. The various potential applications are enormous for use of this apparatus.

It has also been discovered in actual tests, that if the device is placed on an outside door close to the point that the animal, for example, a dog, normally scratches for entrance into the house, the animal very quickly will begin to use the device to indicate to the owner that it is time for the animal to come back in. It is remarkable how quick a pet can be trained to properly use this invention even without the use of the food, candy or other attraction 50 within the container portion 45 of the panel 42 See footnote #1 below.

1: Of particular importance is the location of the horn (buzzer). By having it located on the inside of the door—the dog quickly relates the sound with his action causing activation of the sound. The subsequent opening of the door by the owner teaches the dog to activate the horn when it wants entrance.

The foregoing is considered as illustrative only of the principles of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

I claim:

1. An attention attracting apparatus for actuation by animals comprising:
   alarm means for attracting attention mountable on a door;
   a moveable panel for mounting on the door;
   tension means for the moveable panel for biasing said panel to a normal alarm means unactuated position, and moveable under pressure by an animal to an alarm means actuating position;
   further means for mounting through said door for the dual purpose of providing an electrical contact and also a wire pass through; and
   additional means for providing an electrical contact with said further means mounted on said moveable panel.

2. An apparatus as set forth in claim 1, wherein said tension means for said moveable panel includes screw-driven adjustable means for permitting adjustment of tension to change the amount of biasing of the panel to the alarm means unactuated position.

3. An apparatus as set forth in claim 1, wherein said further means includes an elongated tubular member which is provided for adjustable mounting through said door, and said additional means consist of an adjustable contact mounted on said moveable panel for engagement with the aforesaid elongated tubular member as mounted in the door when the panel is actuated to the alarm means actuating position.

4. An apparatus as set forth in claim 3, wherein said elongated tubular member is provided with threads along the outside thereof and nuts are provided for screwing on the ends of the tubular member, and an electrical wire connection for said moveable panel passes through said elongated tubular member, and at least one of said nuts and at least one end of said tubular member are provided with grooves for passage of said electric wire therethrough.

5. An apparatus as set forth in claim 4, wherein said tension means for said moveable panel includes screw-driven adjustable means for adjusting said tension as desired to change the amount of biasing of the panel to the alarm means unactuated position.

6. An apparatus as set forth in claim 1, wherein said alarm means includes a loud sound emitting horn for audible attention attraction when the alarm means is actuated.

7. An apparatus as set forth in claim 1, wherein said alarm means includes a light actuated structure for visual attention attraction when the alarm means is actuated.

8. An apparatus as set forth in claim 3, wherein said adjustable contact mounted on said moveable panel is finger adjustable, and further provided with locking means for maintaining the adjustment thereof.

9. An apparatus as set forth in claim 8, wherein a boss is mounted on said panel having an internal threaded aperture therethrough, said adjustable contact comprising a contact pin head having a stem which is threaded and in turn screwed through said threaded aperture, and said locking means includes at least one adjustable lock nut mounted upon said threaded stem and on at least one side of said boss.

10. An apparatus as set forth in claim 9, wherein two of said lock nuts are provided on the threaded stem, one on each side of the boss, and furthermore said tension means for said moveable panel includes screw-driven adjustable means for adjusting said tension as desired to change the amount of biasing of the panel to said aforesaid unactuated position.

11. An attention attracting animal actuated apparatus comprising: a door mounted contact and wire feed through element, an adjustable hinged outside door mounted panel member provided with an adjustable contact member for association with said feed through contact element, an inside door mounted means provided with both visual and audible attention attracting elements, and switch and electrical means associated therewith for effecting either single or multiple actuation of said attention attraction elements inside of the door when the outside panel is actuated by an animal.

* * * * *